United States Patent Office 3,651,097
Patented Mar. 21, 1972

3,651,097
SYNTHESIS OF 2-METHYL AND 2-ETHYL-3-HYDROXY - 4,5 - DIHYDROFURAN-4-ONE FROM MONOSACCHARIDE 5-ESTERS
Godefridus Antonius Maria van den Ouweland and Hendricus Gerardus Peer, Zevenaar, Netherlands, assignors to Lever Brothers Company, New York, N.Y.
No Drawing. Filed Mar. 11, 1969, Ser. No. 806,290
Claims priority, application Luxembourg, Mar. 10, 1968, 55,706; Dec. 23, 1968, 57,648
Int. Cl. C07d *5/10*; A23l *1/26*
U.S. Cl. 260—347.8                                    9 Claims

ABSTRACT OF THE DISCLOSURE

Certain 2-alkyl-3-hydroxy-4,5-dihydrofuran-4-ones useful as flavouring agents, particularly in meaty flavours can be prepared from monosaccharide 5-esters. The phosphate esters are particularly useful as starting materials. The monosaccharide 5-esters are reacted with nucleophillic agents, such as diethylamine, in an aqueous medium at a carefully controlled pH between 2 and 8 preferably in the presence of a buffer system.

---

The present invention relates to the preparation of 2-alkyl-3-hydroxy-4,5-dihydrofuran-4-ones having the general Formula I

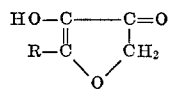

(I)

in which R is either a methyl or an ethyl group. The compound for which R=C$_2$H$_5$ is not mentioned in the literature. The compound for which R=CH$_3$ and a process for its preparation are described in an article which appeared in "Zeitschrift für Lebensmittel-Untersuchung und-Forschung" (Journal for Food Investigation and Research), volume 134, No. 4, Aug. 10, 1967, pp. 230 to 232, according to which the compound is obtained from the reaction of a pentose with a primary amine in the presence of acetic acid, with a yield of 0.25 to 0.4% based on sugar.

These compounds, the systematic name of which is given above, are a tautomeric keto-enol mixture of the compounds shown below, the systematic names of which, in addition to the above, are 2-alkyl-3,4-dihydroxy-furan (Formula II), 2-alkyl-tetrahydrofuran-3,4-dione (Formula III) and 2 - alkyl - 4 - hydroxy-2,3-dihydrofuran-3-one (Formula IV) respectively.

It has proved, however, that the compounds are usually present to a preponderant extent in the form of the compound of Formula I, as shown by infra-red spectra and nuclear magnetic resonance data. Furthermore, the compounds give a typical colour reaction with iron (III) chloride, which reveals the presence of enolic hydroxy groups

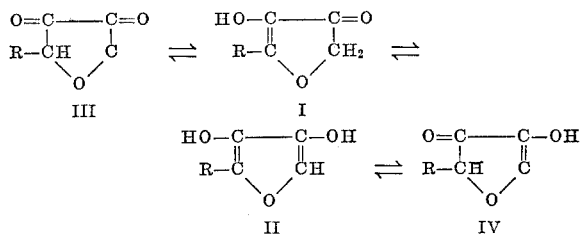

The compounds have marked reducing properties and because of this are suitable for use as antioxidants and photographic developing agent. In addition, the compounds have been shown to be good flavouring agents for enhancing or imparting a meaty flavour into foods.

It has now been noted that it is possible to use for the preparation of these compounds monosaccharide esters having the general formula

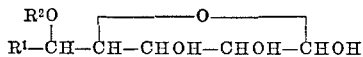

in which R$^1$ is either a hydrogen atom or a methyl group and R$^2$O represents an acid moiety, and in which the hydroxy group carried by the fifth carbon atom from the sugar-reducing group is esterified, these compounds being called below for reasons of brevity monosaccharide 5-esters.

Accordingly the present invention provides a process for the preparation of 2-alkyl-3-hydroxy-4,5-dihydrofuran-4-ones or tautomeric forms thereof, having the general formula

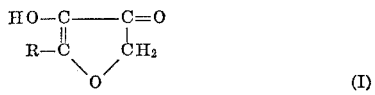

in which R is a methyl or an ethyl group, in which monosaccharide 5-esters of the general formula:

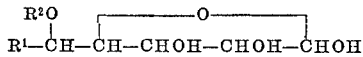

in which R$^1$ is a hydrogen atom or a methyl group and R$^2$O represents an acid moiety, are reacted in an aqueous medium at a pH value of between 2 and 8 with a nucleophillic agent at a temperature between 50 and 200° C.

The use of the monosaccharide 5-esters has the advantage that these compounds may, according to the invention, be transformed with good yields into the required dihydrofuranones. These starting compounds are readily available.

Esters of D- and L-ribose, -arabinose, -xylose and -lyxose, can be used for the preparation of the compound with R=CH$_3$, and those of D- and L-rhamnose and -fucose can be used for the preparation of the compound with R=C$_2$H$_5$. The esters can be derived from inorganic acids such as phosphoric acid, sulphuric acid, hydrogen azide, hydrogen halides, nitric acid and carbonic acid as well as organic acids such as acetic acid, benzoic acid, the arenesulphonic acids such as p-toluenesulphonic acid, and carbanilic acid. In the case of polybasic acids the acid ester or one of its salts, such as the sodium or the barium salt, can be used. It is also possible to use an ester of such a monosaccharide 5-ester.

The monosaccharide 5-esters can be prepared from pentoses and 6-desoxyhexoses by known methods of esterification. They can, as far as the phosphates are concerned, be prepared from nucleotides by elimination of the nitrogenous base, for example as described by J. X. Khym and colleagues in J. Am. Chem. Soc. 76, 5523–5530 (1954). Experience has shown that the nucleotides themselves do not form suitable starting materials. Also enzymatic processes for their preparation are known, as well as chemical processes. For instance, the monosaccharide 5-esters according to the invention can be made by esterification of both 1,2- or 2,3,0-isopropylidenefuranoses and 2,3-O-isopropylidenefuranosides, in which the hydroxyl groups not to be esterified are blocked, as described by e.g. Levene and co-workers (references cited in the examples). Before the esters are submitted to the procedure according to the invention, the blocking groups are preferably removed, which is usually carried out by heating with an acid. The deblocked 5-esters need not be isolated. If the blocked esters are submitted to the procedure according to the invention, 2-methylene- or 2-ethylidene-3,4-O-isopropylidene-5-hydroxy- or -5-methoxytetrahydrofurans are formed in fair to good yields, but on deblocking these products only small yields of the compounds according to the invention are obtained, the compounds moreover being present in a very complicated mixture.

Esters of monosaccharide 5-esters derived from a polybasic acid are sometimes obtained as intermediates during the synthesis of these monosaccharide 5-esters, in which case it is not necessary to hydrolyse them. Suitable esters that can be quoted are, for example, the methyl and ethyl esters and also the benzyl esters as well as, in the case of monosaccharide 5-phosphates, bis-(2-cyanoethyl) ester such as is obtained by phosphorylation by means of bis-(2-cyanoethyl)phosphoryl chloride as described by Tener, J. Am. Chem. Soc. 83, 159–168 (1961). The application of the process is not, however, limited to the esters quoted. It is preferable to use a monosaccharide 5-dihydrogenphosphate and/or one of its salts or esters. In particular, for the preparation of the methyl compound, D-ribose 5-dihydrogenphosphate and/or an ester or a salt thereof, such as the sodium and the barium salts, is preferably used; these compounds can easily be obtained from ribonucleotides or otherwise, and moreover, high yields of the desired compound can be obtained using them. For the preparation of the ethyl compound it is preferred to start from rhamnose 5-dihydrogenphosphate and/or a salt or an ester thereof.

The reaction medium is preferably aqueous because the use of solvents such as methanol, chloroform, dioxane, dimethylsulphoxide and dimethylformamide does not permit the product required to be obtained in the necessary quantities.

As nucleophilic agents it is possible to use amines such as diethylamine, di-isopropylamine, dicyclohexylamine, pyridine, collidine, anions such as the acetate, citrate, phthalate, phosphate, carbonate, azide, sulphite, thiosulphate, pyrrolidonecarboxylate, N-acylaminoalkanoate and hydroxide.

The pH value of the system at the end of the reaction and preferably throughout this reaction should be between 2 and 8 and preferably between 4 and 7.

Adjustment of the pH value is particularly important. It is sufficient for the conditions to be such that the pH value is within the range indicated at the end of the reaction but the yields are relatively high when the pH value is maintained at a given level throughout the reaction and this can be achieved by means of a buffer solution. Such a buffer solution preferably includes the nucleophilic agent. Suitable buffer solutions include, for example, mixtures of sodium acetate/acetic acid, sodium hydroxide/citric acid, citric acid/disodium hydrogen orthophosphate, sodium hydroxide/potassium hydrogen phthalate and disodium hydrogen orthophosphate/potassium dihydrogen orthophosphate, together with their variants as described in the literature.

The best results are obtained with a pH value of between 4.5 and 6 and this is therefore the value that is preferred in particular.

The reaction takes place at temperatures between 50 and 200° C. but it is beneficial to carry it out at a temperature of 80 to 120° C. and in particular at the boiling point of the reaction mixture at atmospheric pressure. It is not advisable to use a temperature higher than the boiling temperature of the reaction mixture because it is then necessary to operate under pressure, which is complicated and moreover, often leads to smaller yields. Neither is it advisable to select a lower temperature because the reaction then has to be continued for a longer period in order to achieve a comparable yield. It is preferred to heat the reaction mixture to boiling point for a suitable period.

The reaction period depends on the temperature selected and the nature of the nucleophilic agent. The reaction period is not critical. Thus the expert can easily determine the most favourable period for the process to be carried out.

It is also noted that the yield of product required depends on the amount of nucleophilic agent used in relation to the amount of monosaccharide 5-ester. Good results are obtained with over 75 moles of acetate ions in the sodium acetate/acetic acid buffer solution per mole of monosaccharide 5-ester, or over 50 moles of citric ions in the citric acid/sodium hydroxide buffer solution per mole of monosaccharide 5-ester.

Furthermore, the influence of anti-browning agents is surprising. The addition of 1,2-ethanedithiol increases the yield considerably. Therefore it is preferable to use, according to the invention, a suitable anti-browning agent which is preferably 1,2-ethanedithiol.

EXAMPLES 1 to 14

To 100 ml. of an aqueous solution of 19 millimoles of D-ribose 5-dihydrogen phosphate were added a mixture of the quantities indicated in Table A or a nucleophilic agent and 150 ml. water. The pH value reached a maximum of 8. In example 14 instead of the acid ester the corresponding quantity of disodium D-ribose 5-phosphate was used. The mixture was boiled for 2 hours.

After cooling the pH value was still between 5 and 7. The reaction mixture was continuously extracted for 18 hours by means of ether. The extract was dried over anhydrous sodium sulphate and the ether was then driven off by low-pressure distillation.

The yield was determined by spectrometry as follows.

The residue was taken up in a suitable quantity of absolute methanol. The absorbance at 289 nm. was determined and the quantity (of the furanone derivative) calculated, taking account of molecular absorptivity (see Example 15). The yield was calculated in the usual way from this value on the basis of the initial ribose 5-phosphate and it is expressed as a percentage of the theoretical yield.

TABLE A

| Example | Nucleophilic agents | Quantity Grammes | Quantity Millimoles | Yield, percent |
|---|---|---|---|---|
| 1 | Di-isopropylamine | 4.80 | 47.5 | 5.0 |
| 2 | Dicyclohexylamine | 8.50 | 47.5 | 2.4 |
| 3 | Pyridine | 3.70 | 47.5 | 7.4 |
| 4 | 1,3,5-trimethylpyridine (collidine) | 5.60 | 47.5 | 7.2 |
| 5 | Sodium acetylamino-acetate | 6.60 | 47.5 | 7.0 |
| 6 | Sodium 6-acetylamino- | 8.26 | 47.5 | 4.4 |
| 7 | Basic lead carbonate | 18.31 | 23.75 | 1.7 |
| 8 | Sodium hydroxide | 1.90 | 47.5 | 1.4 |
| 9 | Barium hydroxide | 7.48 | 23.75 | 5.0 |
| 10 | Calcium hydroxide | 1.76 | 23.75 | 5.4 |
| 11 | Sodium acetate | 3.90 | 47.5 | 4.3 |
| 12 | Sodium sulphite | 2.99 | 23.75 | 7.6 |
| 13 | Sodium azide | 3.09 | 47.5 | 4.0 |
| 14 | Sodium thiosulphate pentahydrate | 5.89 | 23.75 | 10.0 |

EXAMPLE 15

Synthesis of 5-methyl-4-hydroxy-2,3-dihydrofuran-3-one

The D-ribose 5-dihydrogen phosphate was prepared from nucleotides as described by Khym and colleagues (ref. cit.).

A suspension of 900 ml. of a Bio-Rad AG 50W-X8 cation exchange resin in 450 ml. water was heated to 100° C. To this vigorously stirred suspension was added 150 g. (0.3 mole) of a commercially available 50/50 mixture of disodium 5'-inosinate and disodium 5'-guanilate (including 20% by weight of water). After 4 minutes the mixture was cooled in ice to room temperature and filtered. The ion exchange resin separated by filtration was washed with water. The filtrate (total volume 1000 ml.) included 43.5 g. (0.189 mole) D-ribose 5-dihydrogen phosphate. To this was added 332 g. (2.84 moles) N-acetylglycine and the pH value was adjusted to 5.7 by means of sodium hydroxide. The reaction mixture was refluxed for 8 hours in an atmosphere of nitrogen. After cooling, the mixture was extracted continuously for 24 hours by means of ether. The ether extract was dried over anhydrous sodium sulphate and the ether separated by evaporation. 5.25 g.

TABLE H

| pH value | Na₂HPO₄·2H₂O Grammes | Na₂HPO₄·2H₂O Milli-moles | KH₂PO₄ Grammes | KH₂PO₄ Milli-moles | Total vol. (ml.) | Yield (percent) |
|---|---|---|---|---|---|---|
| 5.0 | 5.80 | 33 | 54.44 | 400 | 110 | 40.7 |
| 5.3 | 10.12 | 57 | 53.08 | 390 | 110 | 43.1 |
| 5.5 | 18.30 | 103 | 52.00 | 382 | 110 | 46.9 |
| 5.7 | 18.53 | 104 | 49.00 | 360 | 110 | 47.7 |
| 5.9 | 26.30 | 148 | ¹ 29.44 | 213 | 74 | 26.6 |
| 6.8 | 55.00 | 309 | ¹ 24.84 | 180 | 100 | 1.0 |

¹ Replaced by NaH₂PO₄·2H₂O.

EXAMPLE 27

The work described in Example 24 was repeated with various quantities of sodium acetate and acetic acid as indicated in Table J, together with 1.77 millimoles of D-ribose 5-dihydrogen phosphate. The constituents of the buffer was used in such proportions that the pH value was always 5.5.

TABLE J

| Sodium acetate Grammes | Sodium acetate Milli-moles | Acetic acid Grammes | Acetic acid Milli-moles | Total vol. (ml.) | Yield (percent) |
|---|---|---|---|---|---|
| 8.07 | 97.4 | 1.29 | 21.6 | 40 | 37.5 |
| 12.1 | 147.6 | 1.94 | 32.4 | 47.5 | 38.1 |
| 14.58 | 177.8 | 2.27 | 37.8 | 63.9 | 42.0 |
| 16.46 | 203.2 | 2.59 | 43.2 | 71.6 | 43.0 |
| 20.83 | 254 | 3.24 | 54.0 | 87 | 43.3 |
| 24.99 | 304.8 | 3.89 | 64.8 | 102.4 | 45.5 |

EXAMPLE 28

The work described in Example 25 was repeated with various quantities of sodium hydroxide and citric acid as indicated in Table K. In this case again, the pH value was always 5.5.

TABLE K

| Sodium hydroxide Grammes | Sodium hydroxide Milli-moles | Citric acid Grammes | Citric acid Milli-moles | Total vol. (ml.) | Yield (percent) |
|---|---|---|---|---|---|
| 2.02 | 50.5 | 4.0 | 19.0 | 50 | 24.0 |
| 8.08 | 202 | 16.17 | 77 | 50 | 37.3 |
| 12.0 | 300 | 24.6 | 117 | 60 | 42.7 |
| 20.2 | 505 | 39.13 | 186 | 100 | 43.6 |

EXAMPLE 29

To an aqueous solution of 43.7 g. (0.19 mole) D-ribose 5-dihydrogen phosphate in 1000 ml. water was added a solution of 1706 g. sodium acetate and 259 g. acetic acid in 4300 ml. water. After adding 1.88 g. (20 millimoles) 1,2-ethanedithiol the mixture was boiled for 2 hours. After the mixture was treated as described in Example 18. Thus 11.9 g. (52.2%) of gas chromatographically pure compound was obtained.

EXAMPLE 30

25 g. (0.13 mole) 1,2-O-isopropylidene-xylofuranoside prepared as described by P. A. Levene in J. Biol. Chem. 102, 317 (1933) was dissolved in 125 ml. of anhydrous pyridine and cooled to −30° C. To this solution was added a solution of 12.9 ml. (1.6 moles) phosphorus oxychloride in 30 ml. chloroform. The mixture was then brought to −15° C. and stirred for 2 hours at this temperature. Then water was carefully added a little at a time, after which the mixture was neutralised by means of barium hydroxide (indicator: phenolphthalein). The pyridine was eliminated under vacuum and the aqueous solution obtained acidified by the use of up to 2N sulphuric acid then heated for 2 hours at 80° C. After cooling the pH value was brought to about 5 by means of barium hydroxide. After filtration the filtrate was added to a solution of 164 g. (2.03 moles) sodium acetate and 25.9 g. (0.43 mole) acetic acid in 700 ml. water. The mixture was boiled for 2 hours and after cooling it was continuously extracted for 18 hours by means of ether. The ether extract, dried over anhydrous sodium sulphate and evaporated, gave a gas chromatographically pure product which was identical with that obtained in Example 15.

EXAMPLE 31

A previously cooled solution of 9.6 g. (0.05 mole) 1,2,-O-isopropylidene-1-arabofuranose prepared by the process of P.A. Levene, J. Biol. Chem. 116, 189 (1936) in 160 ml. of anhydrous pyridine was added quickly at a temperature of −30 to −40° C. to a mixture of 5 g. phosphorus oxychloride and 30 ml. of anhydrous pyridine. The temperature was then brought to −15° C. and the mixture stirred for 2 hours. At the end of the stirring, 40 ml. of a 90% pyridine aqueous solution and then about 100 ml. of iced water were added to the mixture, drop by drop, at a temperature below −20° C. The solution was made alkaline by means of a barium hydroxide solution. The pyridine was then driven off by vacuum distillation, a little water being added from time to time. The aqueous solution thus obtained was acidified by means of 0.3 N sulphuric acid, then heated for 2 hours at 90° C. After cooling, the pH value was brought to 5.5 by means of Ba(OH)₂ and after filtration, the solution, to which 164 g. (2.03 moles) sodium acetate, 25.9 g. (0.43 mole) acetic acid and 700 ml. water have been added, was boiled for 2 hours. After cooling the mixture was extracted with ether, the ether extract was then dried over anhydrous sodium sulphate and evaporated. The gas chromatographically pure residue obtained was identical with the compound obtained in Example 15.

EXAMPLE 32

21.5 g. (0.06 mole) methyl-2,3-O-isopropylidene-5-O-p-tolylsulphonyl-ribofuranoside, prepared by the process of P. A. Levene and E. T. Stiller, J. Biol. Chem. 105, 421 (1934) and 9.9 g. (0.066 mole) anhydrous sodium iodide were dissolved in 180 ml. dimethyl formamide and heated at 155° C. for 30 min. After cooling, the reaction mixture was filtered and the residue washed with diethyl ether. The filtrate and the washing liquid were evaporated to a volume of about 50 ml.; 600 ml. water was added and the resulting mixture was extracted with 7 portions of 100 ml. ether. The extract was dried with anhydrous sodium sulphate and evaporated, yielding 17.7 g. of a syrupy residue. To the residue 300 ml. 80% aqueous acetic acid was added and the mixture was heated at 70° for 24 hours, while stirring. To the solution 7400 ml. water was added and the pH value was brought to 5.5 by introducing 1500 g. sodium acetate. It was then boiled for 2 hours. After cooling the mixture was continuously extracted by means of ether and the ether extract was dried with anhydrous sodium sulpahte and evaporated. The residue was purified by crystallisation to give the required compound which has a melting point of 125–127° C.

EXAMPLE 33

21.5 g. (0.06 mole) methyl-2,3-O-isopropylidene-5-O-p-tolylsulphonyl-ribofuranoside obtained by the process of P. A. Levene and E. T. Stiller, J. Biol. Chem. 105, 421 (1934) was stirred for 18 hours at 60° C. in 300 ml. of 80% acetic acid. Then 1500 g. (21.4 moles) sodium acetate and 7400 ml. water were added to the reaction product and the mixture was boiled for 2 hours. The pH value of the mixture was then 5.5. After cooling the mixture was extracted continuously by means of ether. The ether extract was dried over anhydrous sodium sulphate and evaporated to give a residue from which the required compound was isolated and purified by crystallisation. Its melting point was 124–126° C.

EXAMPLE 34

21.8 g. (0.1 mole) methyl-2,3-O-isopropylidene-rhamnofuranoside, obtained according to P. A. Levene, J. Am. Chem. Soc. 57 2306 (1935), and 30.2 g. (0.2 mole)

of a residue being obtained, the spectrophotometric analysis of which shows that it included 55.6% of the product required. The yield is 13.6% calculated on the basis of the D-ribose 5-dihydrogen phosphate. The residue was purified by chromatography on 30 g. of polyamide, such as polycaprolactam (perlon) which is the SC 6 polyamide of Macherey-Nagel & Co., Duren, Germany, free from oligomers or polymers of low molecular weight and with a particle size not exceeding 160 μm. After elution by means of a 50/50 mixture of ether and petroleum ether, 1.93 g. 2-methyl-3-hydroxy-4,5-dihydrofuran-4-one was obtained. Recrystallisation from an ether/petroleum ether mixture gave 1.29 g. of product (which corresponds to a yield of 6.0%); M.P. 127–128° C.; ultra-violet spectrum in methanol (=cm.²/m. mole at 289 nm.

EXAMPLE 16

This work was repeated with various quantities of N-acetylglycine. The results are given in Table B.

TABLE B

Quantity of N-acetylglycine
(mole) [1]:                                     Yield (percent)
  1.4 _____ 7.7
  4.6 _____ 8.9
  8.9 _____ 12.2
 11.8 _____ 12.4
 13.8 _____ 13.5
 14.8 _____ 14.6
 17.9 _____ 13.5
 27.6 _____ 8.6

[1] Per mole of ribose 5-hydrogen phosphate.

EXAMPLE 17

A study was made of the influence of the temperature on the D-ribose 5-dihydrogen phosphate reaction at a pH value of 5.7 in the presence of N-acetylglycine as a nucleophilic agent taken in the same proportions as in Example 15. The results are given in Table C.

TABLE C

| Temperature (° C.) | Time (hours) | Yield (percent) |
|---|---|---|
| 60 | 16 | 2.0 |
| 80 | 16 | 11.2 |
| 80 | 22 | 12.2 |
| About 100 [1] | 8 | 15.6 |
| 120 | 6 | 5.4 |
| 160 | 0.5 | 5.4 |
| 160 | 0.25 | 6.8 |

[1] Boiling temperature of the reaction mixture.

EXAMPLE 18

A solution of 43.5 g. (0.189 mole) D-ribose 5-dihydrogen phosphate in 1000 ml. water was added to a mixture of 259 g. (4.3 moles) acetic acid, 1706 g. (20.8 moles) sodium acetate and 4300 ml. water (pH value=5.5). The mixture was boiled for 2 hours. After cooling the reaction mixture was extracted continuously for 18 hours by means of ether. The ether extract was dried over anhydrous sodium sulphate. After evaporation of the ether 10.35 g. (45.4%) of gas chromatographically pure 2-methyl-3-hydoxy-4,5-dihydrofuran-4-one was obtained. By recrystallization in an ether/petroleum ether mixture a product was obtained with the same melting point and the same extinction as that obtained in Example 15.

EXAMPLES 19 TO 22

The work described in Example 18 was repeated with various buffer soluitons with a pH value of 5.5. A solution of 0.4 g. (1.77 millimoles) D-ribose 5-dihydrogen phosphate was used to which the quantities of buffer solution indicated in Table D and suitable for bringing the pH value to 5.5 were added. The mixture was boiled for 2 hours and the test continued as described in Example 15.

TABLE D

| Example | Buffer solution | Total vol. (ml.) | Yield (percent) |
|---|---|---|---|
| 19 | 254 millimoles of sodium acetate/ 54 millimoles of acetic acid. | 87 | 43.3 |
| 20 | 300 millimoles of NaOH/117 millimoles of citric acid. | 60 | 42.7 |
| 21 | 175 millimoles of NaOH/330 millimoles of porassium hydrogen phthalate. | 155 | 45.0 |
| 22 | 103 millimoles of disoduim hydrogen orthophosphate/382 millimoles of potassium dihydrogen orthophosphate. | 100. | 47.0 |

EXAMPLE 23

A study was made of the influence of the reaction time. To a solution of 1.77 millimoles of D-ribose 5-dihydrogen phosphate were added 12.1 g. (135.4 millimoles) sodium acetate and 1.94 g. (32.3 millimoles) acetic acid and the volume was then brought up to 47.5 ml. The pH value was 5.5. The mixture was boiled for the times indicated in Table E then treated as described in Example 18. The yield was determined by spectrophotometry.

TABLE E

Time (hours):                                   Yield (percent)
  1 _____ 30.0
  2 _____ 38.1
  2.5 _____ 38.1
  3 _____ 36.4
  3.5 _____ 36.2

EXAMPLE 24

The quantities of sodium acetate indicated in Table F were dissolved in a little water and then the quantities of acetic acid also indicated in Table F were added. A solution of 1.77 millimoles of D-ribose 5-dihydrogen phosphate was added to this mixture, then water to a volume of 40 ml. The reaction mixture was boiled for 2 hours, then treated as in Example 18. The yield was determined by spectrophotometry.

TABLE F

| pH value | Sodium acetate | | Acetic acid | | Yield (percent) |
|---|---|---|---|---|---|
|  | Grammes | Millimoles | Grammes | Millimoles |  |
| 5.3 | 7.78 | 94.8 | 1.51 | 25.2 | 26.7 |
| 5.4 | 7.88 | 96.1 | 1.40 | 23.4 | 36.2 |
| 5.5 | 8.07 | 97.4 | 1.29 | 21.6 | 37.6 |
| 5.6 | 8.41 | 102.6 | 1.05 | 17.4 | 33.9 |
| 5.8 | 8.90 | 108.6 | 0.69 | 11.4 | 28.8 |

EXAMPLE 25

The work described in Example 24 was repeated with the quantities of sodium hydroxide and citric acid indicated in Table G and with 1.77 millimoles of D-ribose 5-dihydrogen phosphate, the total volume also being given in the table.

TABLE G

| pH value | Sodium hydroxide | | Citric acid | | Total vol. (ml.) | Yield (percent) |
|---|---|---|---|---|---|---|
|  | Grammes | Millimoles | Grammes | Millimoles |  |  |
| 2.2 | 6.0 | 150 | 64.25 | 306 | 90 | 1.2 |
| 3.0 | 7.0 | 175 | 41.10 | 196 | 65 | 3.0 |
| 3.5 | 9.0 | 225 | 41.48 | 198 | 70 | 5.6 |
| 4.0 | 10.0 | 250 | 36.16 | 172 | 60 | 13.4 |
| 4.5 | 11.0 | 275 | 23.32 | 111 | 60 | 38.3 |
| 5.1 | 12.0 | 300 | 30.0 | 145 | 60 | 43.4 |
| 5.3 | 12.0 | 300 | 27.8 | 132 | 60 | 44.0 |
| 5.5 | 12.0 | 300 | 24.6 | 117 | 60 | 42.7 |
| 6.5 | 13.0 | 325 | 22.68 | 108 | 60 | 4.7 |

EXAMPLE 26

The work described in Examples 24 and 25 was repeated with the quantities of disodium hydrogen orthophosphate and potassium dihydrogen orthophosphate indicated in Table H, together with 1.77 millimoles of D-ribose 5-dihydrogen phosphate, the $KH_2PO_4$ being replaced in the tests carried out with a higher pH value by $NaH_2PO_4$ for reasons of solubility.

2-cyanoethyl phosphoryl chloride, prepared according to Tener, J. Am. Chem. Soc. 83 159–168 (1961), were dissolved in 1000 ml. pyridine dried on potassium hydroxide. To this solution, 167 g. dicyclohexyl-carbodiimide were added. After the solution had stood for 2 days at ambient temperature, 100 ml. water were added; after standing for one hour, the reaction mixture was evaporated to dryness in vacuo. The residue was partitioned between 200 ml. chloroform and 200 ml. water. The aqueous layer containing mono-cyanoethyl 2,3, - O-isopropylidene-rhamnofuranose 50 phosphate was evaporated to dryness. The residue was added to 1200 ml. 0.5 N lithium hydroxide solution and the solution obtained heated to boiling for 45 min. After cooling to ambient temperature, the solution was treated with an acid cation exchanger (Bio-Rad AG 50 W–X8, a 50–100 mesh sulphonated polystyrene; 480 g.=2450 m. eq.); 2-3-O-isopropylidenerhamnofuranose dihydrogen 5-phosphate was obtained by evaporation to dryness in vacuo.

The compound was converted into rhamnose dihydrogen 5-phosphate by heating the residue with 450 ml. 80% acetic acid at 100° C. for 5 hours, after which it was diluted with 1500 ml. water. The pH value of the solution was then adjusted to 5.5 by addition of 1215 g. sodium acetate. The solution was heated to boiling for 2 hours. After cooling the reaction mixture was continuously extracted with diethyl ether for 18 hours. The ether extract was dried with anhydrous sodium sulphate and evaporated. The residue contained 0.82 g. (=6.5%) of the desired compound 2-ethyl-3-hydroxy-4,5-dihydrofuran-4-one calculated on methyl isopropylidenerhamnofuranoside; it was isolated by preparative gaschromatography (column: 150 x 0.2 cm.; support: Diaport S ex. Messrs. Hewlett Packard, a silanated silicagel; loaded with 1% Carbowax 20 M, a polyethylene glycol with a molecular weight greater than 20,000 and 10% Apiezon L, a mixture of stable higher alkanes ex. Messrs. Shell Comp.; carrier gas: nitrogen; velocity 25 ml./min.; programmed temperature, starting temperature: 100°, dT./dt.=4°/min.; retention time 13.5 min., as compared with 11.3 min. for dodecane and 18.9 min. for tetradecane). Its infrared spectrum had bands at 3250, 1700, 1632, 1445, 1420, 1320, 1182, 1020, 970 and 040 cm.$^{-1}$. Its mass spectrum had a parent peak at $m/e$ 128 and striking peaks at $m/e$ 113, 99, 71 and 57. Its ultraviolet spectrum had an absorption band at 289 nm. (=9,000 cm.$^2$/mmol (in methanol). B.P. 227° C.)

EXAMPLE 35

A study was made of the influence of the reaction time. To an aqueous solution of 0.245 g. (1 mmol) rhamnose 5-dihydrogen phosphate was added (6.92 g. (174.4 mmol) sodium hydroxide and 16.16 g. (76.6 mmol) citric acid monohydrate; the volume was then brought up to 60 ml. The pH was then 5.3. The mixture was boiled for the times indicated in Table L. After cooling, the reaction mixture was extracted continuously for 18 hours with diethyl ether. The ether extract was dried with anhydrous sodium sulphate. After evaporation of the solvent, the yield was determined by spectrophotometry by taking up the residue in a suitable quantity of absolute methanol determining the absorbance at 289 nm. and calculating the quantity of the furanone derivative taking account of the molar absorptivity given in Example 34. The yields are given in Table L.

TABLE L

| Time (hours): | Yield (percent) |
|---|---|
| 1 | 6.0 |
| 2 | 7.5 |
| 3 | 8.0 |
| 4 | 7.2 |

EXAMPLE 36

A study was made of the influence of the pH value. The quantities of sodium hydroxide indicated in Table M were dissolved in a small amount of water, to which the quantities of citric acid monohydrate indicated in the same table were added. A solution of 0.245 g. (1 mmol) rhamnose 5-dihydrogen phosphate was then added and the volume brought up to 60 ml. The mixture was boiled for 2 hours, after which the mixture was worked up as described in Example 35. The yields, determined spectrophotometrically, are given in Table M.

TABLE M

| pH | Sodium hydroxide | | Citric acid monohydrate | | Yield (percent) |
|---|---|---|---|---|---|
| | G. | Mmol. | G. | Mmol. | |
| 4.0 | 5.80 | 145 | 21.0 | 100 | 5.4 |
| 5.3 | 6.98 | 174.4 | 16.16 | 76.6 | 9.0 |
| 6.5 | 7.56 | 189 | 13.2 | 62.8 | 4.0 |

EXAMPLE 37

A study was made of the influence of the quantity of nucleophilic agent at the optimum pH value. To an aqueous solution of the quantities indicated in Table N of sodium acetate and acetic acid were added an aqueous solution of 0.245 g. (1 mmol) rhamnose 5-dihydrogen phosphate and the volume brought up to 60 ml. The pH being 5.5 in each case. The resulting solution was boiled for 2 hours and worked up as described in Example 35. The yields determined spectrophotometrically, are given in Table N.

TABLE N

| Sodium acetate | | Acetic acid | | Yield (percent) |
|---|---|---|---|---|
| G. | Mmol. | G. | Mmol. | |
| 2.70 | 57.2 | 0.68 | 11.34 | 5.8 |
| 9.56 | 116.4 | 1.50 | 25.0 | 6.2 |
| 14.52 | 177.0 | 2.25 | 37.6 | 8.4 |

EXAMPLE 38

To 6.98 g. (174.4 mmol) sodium hydroxide dissolved in a small amount of water 16.16 g./citric acid monohydrate was added. A solution of 0.245 g. (1 mmol) rhamnose 5-dihydrogen phosphate was added and the volume brought up to 60 ml. After adding 10 mg. 1,2-ethanedithiol the mixture was boiled for 2 hours, after which the mixture was worked up as described in Example 2. The yield, determined spectrophotometrically, was 11%, as compared to 9% (see Example 36) when no ethanedithiol is added.

What is claimed is:

1. A process for the preparation of 2-alkyl-3-hydroxy-4,5-dihydrofuran-4-ones, having the general formula

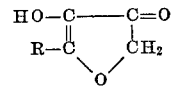

in which R is a methyl or an ethyl group, in which monosaccharide 5-esters of the general formula:

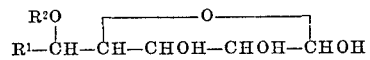

in which $R^1$ is a hydrogen atom or a methyl group and $R^2O$ represents an acid moiety, are reacted in an aqueous medium at a pH value of between 2 and 8 with a nucleophilic agent at a temperature between 50 and 200° C.

2. A process according to claim 1 for he preparation of 2-methyl-3-hydroxy-4,5-dihydrofuran-4-one, in which a pentose 5-ester of the general formula

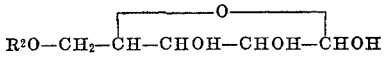

in which $R^2O$ represents an acid moiety, is reacted.

3. A process as claimed in claim 1 in which a monosaccharide 5-dihydrogen phosphate or an ester or a salt thereof is reacted.

4. A process as claimed in claim 3, in which D-ribose 5-dihydrogen phosphate or an ester or a salt thereof is reacted.

5. A process as claimed in claim 3, in which rhamnose 5-dihydrogen phosphate or an ester or a salt thereof is reacted.

6. A process as claimed in claim 1 in which the pH value of the aqueous medium is between 4 and 7.

7. A process as claimed in claim 6, in which the pH value of the aqueous medium is between 4.5 ad 6.

8. A process as claimed in claim 6 in which the reaction is carried out at the boiling temperature of the reaction mixture at atmospheric pressure.

9. A process as claimed in claim 6 in which 1,2-ethanedithiol is added to the reaction mixture.

References Cited

Severin et al., Zeitschrift fur Lebensmitteln Untersuchung und Forschung, August 1967, vol. 134, No. 4, p. 230-1.

Tonsbeck et al., Journal of Agricultural and Food Chem. November 1968, vol. 16, No. 6, p. 1016-21.

ALEX MAZEL, Primary Examiner

B. I. DENTZ, Assistant Examiner

U.S. Cl. X.R.

99—140; 252—407; 96—66

UNITED STATES PATENT OFFICE
CERTIFICATE OF CORRECTION

Patent No. 3,651,097　　　　Dated March 21, 1972

Inventor(s) Godefridus Antonius Maria Van Den Ouweland and Hendricus Gerardus Peer It is certified that error appears in the above-identified patent and that said Letters Patent are hereby corrected as shown below:

Column 1, line 9 - Mar. 10, 1968 should read Mar. 18, 1968

Signed and sealed this 18th day of June 1974.

(SEAL)
Attest:

EDWARD M. FLETCHER, JR.
Attesting Officer

C. MARSHALL DANN
Commissioner of Patents